No. 862,877. PATENTED AUG. 13, 1907.
G. BRENDEL.
VEHICLE BRAKE.
APPLICATION FILED AUG. 23, 1905.

Witnesses:
O. A. Williams
James C. Herron

Inventor:
George Brendel
per John Hutt Roung
his Atty.

UNITED STATES PATENT OFFICE.

GEORG BRENDEL, OF PITTSBURG, PENNSYLVANIA.

VEHICLE-BRAKE.

No. 862,877.     Specification of Letters Patent.     Patented Aug. 13, 1907.

Application filed August 23, 1905. Serial No. 275,349.

*To all whom it may concern:*

Be it known that I, GEORG BRENDEL, a citizen of the United States, residing at Pittsburg, in the county of Allegheny and State of Pennsylvania, have invented a new and useful Improvement in Vehicle-Brakes, of which improvement the following is a specification.

My invention relates to improvements in vehicles and brake attachments therefor.

The objects of my invention are to produce a fifth wheel for vehicles and a brake mechanism therefor which can be applied to the forward axle without marring the appearance of the vehicle and yet furnishing security and efficiency required in such appliances.

My invention is especially applicable to cabs and carriages in which it is desirable to as much as possible conceal the brake mechanism.

To accomplish these several objects, my invention consists in the novel construction and arrangement of parts hereinafter more specifically described, reference being had to the accompanying drawings, forming part of this specification, in which—

Figure 1:
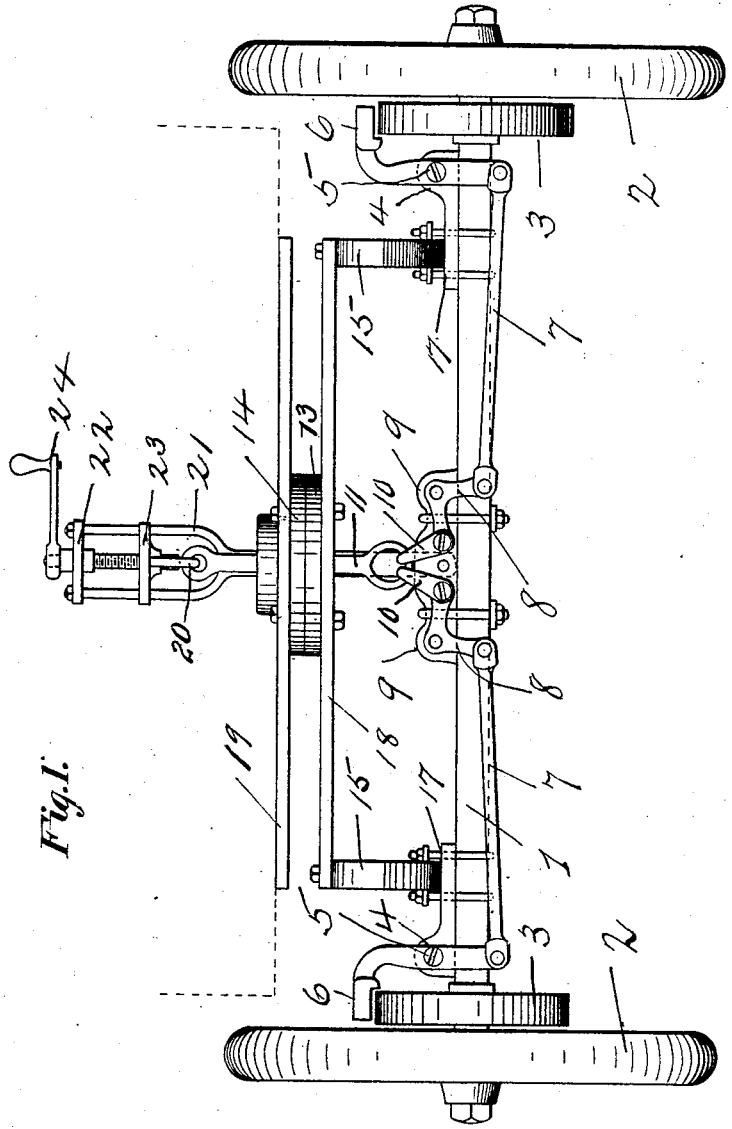
Figure 2:
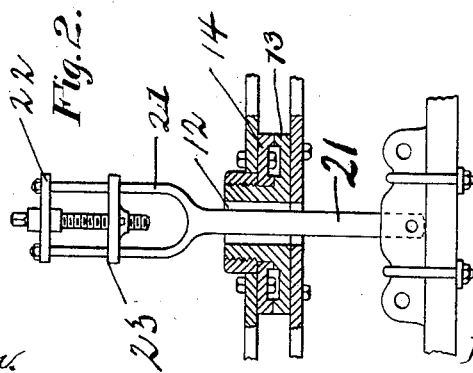

Figure 1 indicates an elevation of the forward axle of a vehicle, my invention being applied thereto. Fig. 2 is a vertical elevation, partly in section.

Referring to said drawings, 1 is the front axle of a vehicle, on the ends of which the wheels 2, 2, are mounted in the usual manner. At the inner sides of said wheels at the center thereof are provided disks 3, 3, which are integral with the same and through which the ends of the axle project. Immediately adjacent said disks the said axle is provided with upwardly extending lugs 4, 4, which are suitably secured to said axle and in which orifices are formed in which bolts 5, 5, are secured to which the brake shoes 6, 6, are pivotally mounted, the lower ends of said brake shoes being respectively connected to the outer ends of the rods 7, 7, the inner ends of which are connected pivotally to the bell cranks 8, 8, which are pivotally mounted upon the ends of the lug 9, which is secured to the center of said axle. The inner ends of said bell cranks are secured to respectively links 10, 10, the upper ends of which are connected with or secured to the vertically disposed rod 11, which projects through an orifice 12 formed in the casting 13, on which is mounted the fifth wheel 14 of the vehicle. Springs 15, 15, are mounted upon the axle, being secured thereto by the bolts 17, and mounted upon the upper side of said springs are the transverse bars 18, to which the said casting is bolted. The forward end of the vehicle is secured to the transverse bars 19, which are securely fixed to and rotate with the fifth wheel, the body of the vehicle being shown in dotted lines in Fig. 1. The upper end of the vertically disposed rod 11, is suitably secured to a yoke 20, which is carried by the yoke 21, the lower end of which latter is secured in the central lug 9, being as shown in the drawings pivotally connected to said lug, the upper end of said yoke terminating in a cap, 22, in which a bearing is formed for the screw which operates in a cap 23 mounted upon the yoke 20, the upper end of said screw being provided with a crank 24, by means of which it is operated.

I claim as my invention and desire to secure by Letters Patent:

1. In a vehicle, the combination with an axle, of wheels mounted thereon, each of said wheels having a disk on its inner side integral therewith, brake-shoes pivotally mounted upon the axle, a vertically disposed yoke connected to said axle at the center thereof, a vertically disposed screw mounted in the upper end of said yoke, a vertically disposed rod associated with said yoke, rods connected to said brake shoes, links connecting said rods to said vertically disposed rod, means connecting said rod and said screw, and means to operate said screw.

2. In a vehicle, the combination with an axle, and wheels mounted thereon, of disks arranged on the inner sides of said wheels, brake shoes pivotally mounted upon the axle and coöperating with said disks, a vertically-disposed yoke pivotally connected to the axle, a vertically-disposed rod associated with said yoke, connections between said rod and said brake shoes for actuating the latter, a vertically-disposed screw arranged in the upper end of said yoke, and connections between said screw and said rod for actuating the latter and the brake shoes when said screw is operated.

In testimony whereof, I have hereunto signed my name in the presence of two subscribing witnesses.

GEORG BRENDEL.

In the presence of—
   CLARENCE A. WILLIAMS,
   JAMES C. HERRON.